Dec. 1, 1964   F. E. AHLBIN ETAL   3,159,368
QUICKLY DETACHABLE POWERED WINCH MOUNTING MEANS
Filed March 14, 1962   2 Sheets-Sheet 1
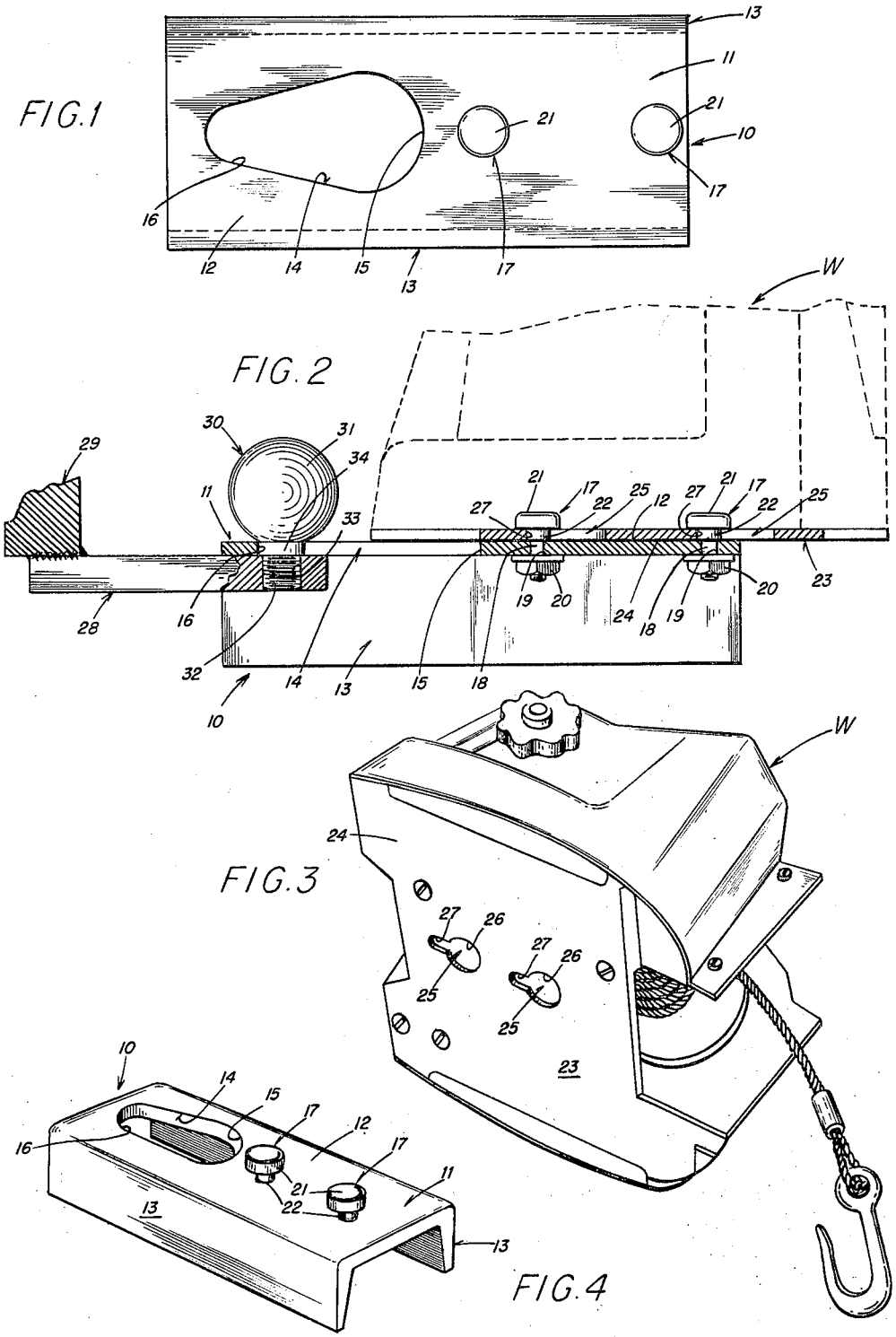

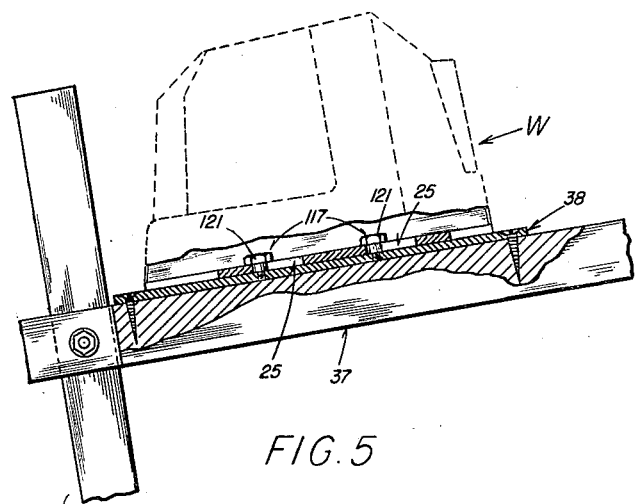
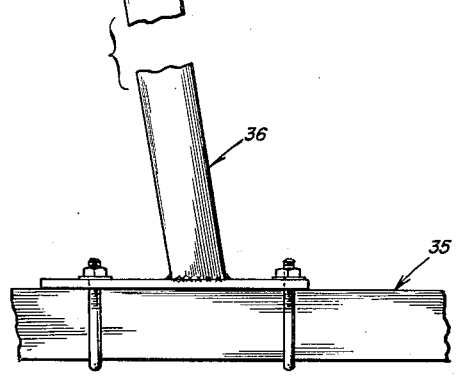
FIG. 5
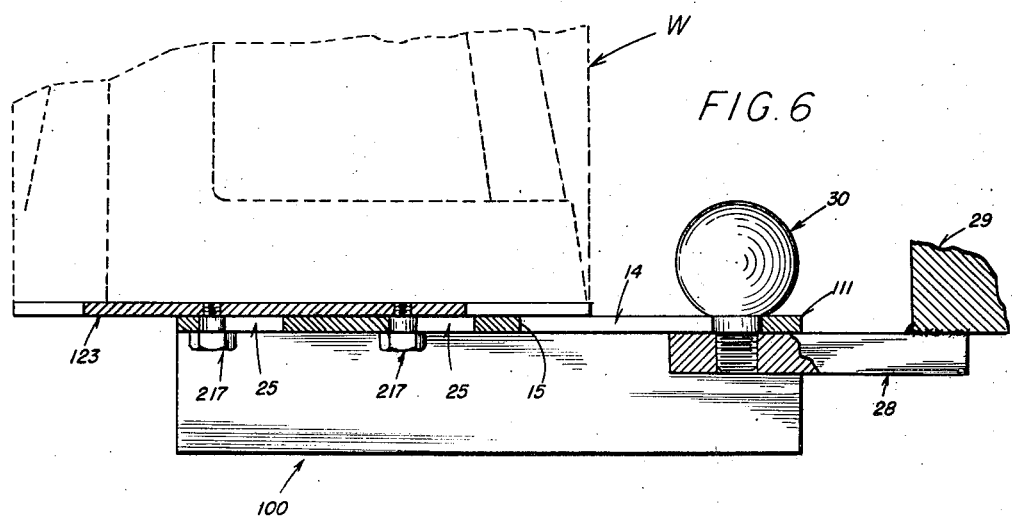
FIG. 6

United States Patent Office

3,159,368
Patented Dec. 1, 1964

3,159,368
QUICKLY DETACHABLE POWERED WINCH
MOUNTING MEANS
Fred E. Ahlbin, 3663 Congress St., Fairfield, Conn., and
William G. Hembling, Milford, Conn.; said Hembling
assignor to said Ahlbin
Filed Mar. 14, 1962, Ser. No. 179,715
4 Claims. (Cl. 248—225)

The present invention relates to mounting means for powered winches which may be of the type disclosed in the copending application of Fred E. Ahlbin for Power Driven Cable Winch and Drive and Brake Means Thereof, Serial No. 12,360, filed March 2, 1960 now Patent No. 3,051,447.

Prior to the present invention it has been a practice fixedly to mount powered winches to a variety of types of supports by means of bolts extending through holes in the base plates of such winches and aligned holes in support structure, such bolts carying nuts for securely fastening the structures together. It is frequently desirable to demount such winches for remounting with other support means for increasing the advantageous use thereof, but when such fastening means are employed the nuts of the mounting bolts must be removed and the bolts withdrawn for reinsertion in alternate supporting means, thereafter again to receive the nuts with suitable tightening of the latter. Such operations are time consuming and tedious. Further, many supports to which such winches might be advantageously mounted are of conventional designs, which do not permit them readily to be mounted thereto by such conventional bolts without the use of specially designed adapting structures. For example, a winch of the type disclosed in the above-identified copending application is well suited to use for loading and unloading boats upon and from trailers hitched to automobiles or cars. For this purpose, it is a common practice securely to mount to the back end of the frame of the car a draft plate carrying a ball hitch pin, with the tongue of such a conventional trailer being equipped with connecting means engageable of such ball hitch pins. In order to employ such a winch for loading and unloading the boat from the trailer, the tongue of the latter is provided with suitable support means, such as a post having a lateral bracket arm, on which the winch is mounted by bolts in the manner indicated above. Such a winch could be put to advantageous service for other purposes if it were readily demountable from the trailer structure and easily mountable to the back end of the car, to serve as powered draft means for a variety of purposes including drawing the car out of difficult situations, such as a ditch, soft sand, etc. Such desirable varied uses have created a demand for quickly detachable and interchangeable mounting means which, prior to the present invention, has not been satisfied.

It is an object of the present invention to provide such quickly detachable mounting means for powered winches that are economically produced in mass production and efficiently permit employment thereof for ready interchangeable mountings.

A more specific object of the present invention is to provide such quickly detachable mounting means in a simple and economical form that permits connection of the powered winch to such a conventional ball hitch pin or to a variety of types of other forms of mounts including trailer structure. The quickly detachable mounting means of the present invention may, in one form, consist of winch base plate means upon which the mechanism of the winch is supported and hitch plate means readily attachable in a demountable manner thereto while in turn being demountably connectable in a simple manner to conventional forms of or specially designed supports. For this purpose, the winch base plate means has a mounting face and the hitch plate means has a companion mounting face to be abutted to the former for secure attachment. The hitch plate means is provided with a keyhole slot therein having an enlarged slot section adapted to receive therethrough any headed draft pin, such as the ball head of a ball hitch pin conventionally mounted upon car draft means, such as the draft bar frequently attached to the back end of the frame of the car and carrying such a ball hitch pin. The keyhole slot also has a narrower slot section which merges with the enlarged slot section slidably to receive therein the shank of such a hitch pin. A plurality of detachable spaced winch anchoring means are provided with each comprising a pair of complementary and interfitting elements. One of each of such pair of complementary interfitting elements consists of a stud having a shank extending normally from the mounting face of either of the plate means and terminating in an enlarged head spaced from this mounting face a distance which is preferably slightly greater than the thickness of the other plate means. Means are provided which define a keyhole slot in the other of the plate means as the other of the complementary pair of interfitting elements with this slot having an enlarged section, adapted to receive therethrough the enlarged head of the first-mentioned complementary element or stud, and a narrower section merged with the enlarged section and adapted slidably to receive therein the shank of the complementary stud. These studs are demountably lockable simultaneously in the narrower sections of the plurality of keyhole slots by the stud heads when the stud shanks are slid out of the enlarged sections into the narrower sections of the plurality of the complementary keyhole slots.

In a preferred form of the invention, the hitch plate means is provided as a length of structural channel with the web thereof having the hitch pin ball-receiving keyhole slot in one of its end sections and carrying on its other end section a pair of the anchoring studs. In this form the base plate of the winch is provided with a pair of the anchoring keyhole slots which are adapted detachably to receive the pair of studs. Thus, this hitch plate is readily mountable and demountable to and from the ball hitch pin conventionally carried at the back end of the car, and also to the winch. The winch may also be mounted readily to any other support means which is provided with a similar pair of headed studs, and for this purpose the bracket arm mounted upon the post of a trailer tongue may carry such a pair of mounting studs.

In another form of the hitch plate means of the present invention the means for detachably securing such winch to the hitch plate means may comprise a reversal of parts. For example, the plurality of headed studs may be mounted to extend downwardly from the bottom face of the winch base plate and the plurality of complementary keyhole slots for receiving these headed studs may be provided in the end section of the hitch plate which, in the preferred form, carries the headed studs. In this alternative form of the invention the other support means, such as the bracket arm on the trailer tongue post, will carry similar complementary means detachably to receive the headed studs on the bottom face of the winch base plate. For example, the bracket arm on the trailer tongue post may be fitted with an anchoring plate which is provided with the plurality of stud-receiving keyhole slots. As a result, the winch may be selectively mounted either on this form of the hitch plate means of the present invention or upon such other support means with equal facility and interchangeability. This alternative form may not be as desirable as the preferred form since, if the headed studs are mounted to and depend from the underface of the winch base plate, the winch may rock when it is rested upon a flat surface having no receptive holes for the depending studs. However, when this is not an objectionable characteristic, such alternative form of the detachable means for temporarily fastening the winch base plate to a variety of types of support means including the hitch plate means will satisfy with equal facility all other requirements.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is a top plan view of one form of the hitch plate means or adaptor of the present invention;

FIG. 2 is a side elevational assembly view showing a portion of draft means mounted to the rear portion of a car with parts broken away and in section, a portion of a powered winch with parts indicated in dotted lines and others in section, and a longitudinal section of the hitch plate means with the latter intervening the draft means and winch and temporarily connecting them together;

FIG. 3 is a perspective view of the powered winch indicated in FIG. 2, as viewed from the bottom of its base plate means;

FIG. 4 is a perspective view of the hitch plate means of FIG. 1;

FIG. 5 is a side elevational view of the powered winch unit of FIGS. 2 and 3, parts being shown in dotted lines and others in section, depicting mount thereof on other support means in the form of a trailer tongue post and its lateral bracket arm, with parts of this support means broken away and in section; and FIG. 6 is a view similar to FIG. 2 of a modified form in which parts are reversed.

Referring to the drawings, in which like numerals identify similar parts throughout, it will be seen that a quickly detachable mounting means of the present invention comprises a hitch plate means or adaptor 10, illustrated in FIGS. 1, 2 and 4. The hitch plate means 10 preferably is in the form of a length of structural channel having a substantially flat web portion 11 provided with a top abutment face 12, with the web strengthened along its side edges by depending flanges 13. One end section of the web 11 has formed therein a keyhole slot 14 having an enlarged section 15 and a narrower section 16 merged together. The other end section of the hitch plate web 11 is provided with at least a pair of headed studs 17, preferably aligned with the longitudinal dimension of the keyhole slot 14. As will be best understood from FIG. 2 each headed stud 17 is a round head bolt of the shouldered shank type having a lower externally-threaded reduced section 18 extending down through hole 19 of the web 11 and on which is threadably engaged a nut 20, an enlarged round head 21 and an intervening shoulder shank section 22 of intermediate diameter. The shoulder sections 22 space the stud heads 21 a certain distance above the top face 12 of the web.

Let it be assumed that the powered winch unit, illustrated at (W) in FIG. 3 and portions of which are indicated in dotted lines in FIG. 2, has a frame which includes a base plate 23 having a flat bottom surface 24 to be mounted upon and in abutting relation to the top surface 12 of the hitch plate unit 10. The winch base plate 23 is provided with a pair of keyhole slots 25, each of which has an enlarged section 26 through which the head 21 of one of the studs 17 may be received. Each keyhole slot 25 also has a relatively narrow section 27 merged with its enlarged section 26 and which is of a width slightly larger than the diameter of the shank shoulder section 22. With the spacing between the axes of the headed studs 17 being equal to the spacing between the centers of the enlarged sections 26 of the keyhole slots 25 in winch base plate 23, the winch unit (W) may be readily mounted upon the hitch plate web 11 by simultaneously slipping the stud heads 21 up through these enlarged keyhole slot sections and then moving the winch forward to slide the shank shoulders 22 into the reduced keyhole slot sections 27, as is illustrated in FIG. 2. Consequently, the hitch plate means 10 is securely mounted to the bottom of the winch (W). Thus the base plate means 23 of the winch (W) is securely anchored in a demountable fashion to the draft plate means 10 by a plurality of complementary pairs of interfitting elements, each comprising one of the headed studs 17 and the keyhole slot 25 into which it is mounted.

Let it be assumed that the back end of a car is provided in any suitable or conventional manner with a conventional hitch carrying a headed draft pin, such as draft bar 28 suitably fastened to a portion 29 of the car frame and carrying a ball hitch pin 30. The hitch pin 30 has a ball head 31 integral with a shank provided with an externally-threaded reduced section 32 threadably received in an internally-threaded hole 33 in the hitch bar. The threaded shank section 32 and the ball head 31 are intervened by an enlarged unthreaded shank section 34, preferably of a length slightly greater than the thickness of hitch plate web 11. With the ball head 31 of a diameter less than the diameter of the enlarged section 15 of the keyhole slot 14 in hitch plate web 11, it may be readily slipped therethrough to permit the unthreaded shank section 34 to be pulled back into the reduced section 16 of this keyhole slot since the width of the latter is slightly greater than the diameter of this unthreaded shank section. The hitch pin head 31 will, in this position, assure that the hitch plate unit 10 is securely connected for draft purposes to the draft bar 28 but readily demountable therefrom.

It will thus be understood that with the powered winch (W) mounted in such fashion to the rear end of the car or the draft bar 28 carried thereby, the winch may be employed in a desirable manner to drag loads toward the back end of the car or, with its cable fastened to suitable anchoring means, such as a pole or tree trunk, the winch can be used to drag the car backward toward the latter. Consequently, the adaptor or hitch plate unit 10 of the present invention increases the utility of such a powered winch. After any such use it is a simple matter to disconnect the hitch plate unit 10 from the ball hitch pin 30 and to demount it from the base plate 23 of the winch for ready storage of the hitch plate unit and the winch in the car.

Since it is intended that such a powered winch as that illustrated at (W) in FIG. 3 be put to service in loading a boat upon a trailer and unloading it from the latter into the water, the trailer draft tongue, a portion of which is illustrated at 35 in FIG. 5, will be provided with an upstanding winch stand or post, indicated at 36, in turn provided with a suitable lateral bracket arm 37 extending rearwardly. In order to mount the winch unit (W) upon the lateral bracket arm 37 in a simple and rapid manner which permits ready demountation therefrom, the bracket arm may be provided with a top plate 38 suitably equipped with a pair of headed and shouldered studs 117, equivalent to the headed stud bolts 17 mounted upon the hitch plate web 11 and with like spacing. Consequently, the heads 121 of the studs 117 may be received in the keyhole slots 25 in the winch base plate 23 for securely anchoring the latter to the bracket arm 37 in a demountable manner.

As has been previously indicated certain parts of the mounting means which are provided for demountable connection of the winch base plate 23 to the hitch plate unit 10 may be reversed. As is illustrated in FIG. 6, the base plate 123 of the winch unit (W) may be equipped with headed studs 217 and the web 111 of the hitch plate unit 100 may be provided with keyhole slots 25, so that the latter may receive the former in a locked manner of the type described above in connection with FIGS. 1 to 4 inclusive.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A powered winch quickly detachable mounting means comprising, in combination,
   (a) winch base plate means upon which mechanism of the winch is supported and
   (b) having a mounting face,
   (c) hitch plate means having front and back ends and
   (d) a mounting face to be abutted to said base plate mounting face,
   (e) the front end of said plate means being provided with a hitch keyhole slot therein having an enlarged slot section adapted removably to receive therethrough the ball head of a ball hitch pin conventionally mountable upon car draft means and a merging narrower slot section extending forward from said enlarged slot section with this narrower slot section being adapted slidably and pivotally to receive therein the shank of such hitch pin when said hitch plate means is moved relatively rearward with said ball head demountably locking it in position,
   (f) a plurality of detachable spaced winch anchoring means each comprising a pair of complementary and interfitting structures,
   (g) one of each of said pair of complementary structures consisting of an anchoring stud having a shank extending normally from the mounting face of one of said base and hitch plate means terminating in an enlarged head spaced from this mounting face, and
   (h) the other of each of said pair of complementary structures consisting of means defining an anchoring keyhole slot in the other of said plate means having an enlarged section adapted to receive therethrough the enlarged head of the complementary anchoring stud and a narrower slot section merged with the enlarged section of this keyhole slot slidably to receive therein the shank of said complementary stud,
   (i) said complementary structures on said hitch plate means being located on the back end of the latter with said anchoring keyhole slots being so oriented with respect to the longitudinal dimension of said hitch plate means as to cause the shanks of said anchoring studs to slide into and be demountably locked simultaneously in the narrower sections of said anchoring keyhole slots by their heads upon relative rearward movement of said base plate means.

2. The winch mounting means as defined in claim 1 characterized by
   (j) said hitch plate means being elongated and
   (k) having longitudinally spaced and aligned therealong the ball hitch pin-receiving keyhole slot and one of each of the pairs of complementary and interfitting structures constituting the plurality of spaced winch anchoring means.

3. A powered winch quickly detachable mounting means comprising, in combination with a winch base plate upon which a winch mechanism is supported and having a mounting face, of
   (a) means defining a pair of spaced elongated and aligned anchoring keyhole slots in said base plate each having an enlarged slot section and a narrower slot section merged therewith and extending forward therefrom,
   (b) an elongated hitch plate means having front and back end sections and
   (c) a mounting face to be abutted to said base plate mounting face with the front end section thereof provided with
   (d) a keyhole slot having an enlarged slot section adapted slidably to receive therethrough the ball head of a ball hitch pin conventionally mountable upon car draft means and a merging narrower section extending forward from said enlarged slot section with the narrower slot section being adapted slidably and pivotally to receive therein the shank of such hitch pin when said hitch plate means is moved relatively rearward with said ball head demountably locking it in position, and with the back end section thereof provided with
   (e) a pair of winch anchoring studs longitudinally aligned with said ball hitch pin-receiving keyhole slot and spaced apart a distance substantially equal to the spacing of said pair of keyhole slots in said winch base plate,
   (f) each of said anchoring studs having a shank extending normally from the mounting face of said hitch plate means and slidably receivable in the narrower section of one of said pair of anchoring keyhole slots and an enlarged head spaced from this mounting face a distance slightly greater than the thickness of said winch base plate,
   (g) each of said stud heads being of a transverse dimension less than the width of the enlarged slot section of one of said pair of anchoring keyhole slots but greater than the narrower slot section merged therewith,
   (h) said pair of stud heads being simultaneously insertable through the enlarged slot sections of said pair of anchoring keyhole slots and
   (i) said pair of studs being demountably lockable simultaneously in said pair of keyhole slots by sliding said stud shanks into the narrower sections of said pair of anchoring keyhole slots from the enlarged sections of the latter after insertion of said stud heads by relative rearward movement of said winch base plate.

4. The winch mounting means as defined in claim 3 characterized by
   (j) said hitch plate means being the web of a length of structural channel.

References Cited in the file of this patent

UNITED STATES PATENTS

| 654,429 | Bartz | July 24, 1900 |
| 857,326 | Buckwalter | June 18, 1907 |
| 1,804,420 | Kelley | May 12, 1931 |
| 3,042,241 | Bauman | July 3, 1962 |
| 3,055,462 | Steele | Sept. 25, 1962 |
| 3,071,099 | Cutlan | Jan. 9, 1963 |

FOREIGN PATENTS

| 655,986 | Germany | Jan. 13, 1938 |